United States Patent
Abbasi et al.

(10) Patent No.: US 7,907,615 B2
(45) Date of Patent: Mar. 15, 2011

(54) METHOD AND APPARATUS TO MANAGE NETWORK ADDRESSES FOR PRIVATE VOICE COMMUNICATIONS

(75) Inventors: Salman Yousef Abbasi, Clifton, NJ (US); Farhad Barzegar, Branchburg, NJ (US); Irwin Gerszberg, Kendall Park, NJ (US); Thomas Wilmer Hill, Succasunna, NJ (US); Scott Joseph Mollica, Red Bank, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1501 days.

(21) Appl. No.: 10/800,106

(22) Filed: Mar. 12, 2004

(65) Prior Publication Data

US 2005/0201381 A1    Sep. 15, 2005

(51) Int. Cl.
*H04L 12/12* (2006.01)
(52) U.S. Cl. .................... 370/395.21; 370/475
(58) Field of Classification Search .................. 370/230, 370/235, 351, 431, 465, 352, 401
See application file for complete search history.

(56) References Cited

U.S. PATENT DOCUMENTS

| | | | |
|---|---|---|---|
| 5,535,338 A * | 7/1996 | Krause et al. | 709/222 |
| 5,590,285 A * | 12/1996 | Krause et al. | 709/218 |
| 5,835,725 A * | 11/1998 | Chiang et al. | 709/228 |
| 6,049,826 A * | 4/2000 | Beser | 709/222 |
| 6,577,628 B1 * | 6/2003 | Hejza | 370/392 |
| 6,657,991 B1 * | 12/2003 | Akgun et al. | 370/352 |
| 6,775,273 B1 * | 8/2004 | Kung et al. | 370/356 |
| 6,928,478 B1 * | 8/2005 | Gangadharan | 709/226 |
| 7,024,480 B2 * | 4/2006 | Weik | 709/227 |
| 7,152,119 B2 * | 12/2006 | Na et al. | 709/245 |
| 7,415,535 B1 * | 8/2008 | Kuik et al. | 709/245 |
| 7,440,415 B2 * | 10/2008 | Wild et al. | 370/254 |
| 7,457,300 B2 * | 11/2008 | Christensen et al. | 370/401 |
| 7,502,840 B1 * | 3/2009 | Bakke | 709/222 |
| 2003/0115298 A1 * | 6/2003 | Baker | 709/220 |
| 2004/0073674 A1 * | 4/2004 | Vergnaud et al. | 709/226 |
| 2004/0076161 A1 * | 4/2004 | Lavian et al. | 370/395.41 |
| 2004/0240440 A1 * | 12/2004 | Wild et al. | 370/389 |
| 2004/0258003 A1 * | 12/2004 | Kokot et al. | 370/254 |
| 2005/0190775 A1 * | 9/2005 | Tonnby et al. | 370/401 |

FOREIGN PATENT DOCUMENTS
WO    WO 2004/014045 A    2/2004
* cited by examiner

*Primary Examiner* — Ricky Ngo
*Assistant Examiner* — Ben H Liu

(57) ABSTRACT

A method and apparatus to manage network address for private voice communication are described.

18 Claims, 3 Drawing Sheets

METHOD AND APPARATUS TO MANAGE NETWORK ADDRESSES FOR PRIVATE VOICE COMMUNICATIONS

BACKGROUND

A Voice Over Packet (VOP) network may communicate voice information, such as from a telephone call, over a packet network. Typically, a VOP call is very sensitive to network latency. Therefore, completing a VOP call over a public network, such as the Internet, may result in poor voice quality. Consequently, there may be need for improvements in completing a VOP call in a device or network.

SUMMARY

The embodiments may be directed to techniques to manage network addresses for a communications network. More particularly, the embodiments may assign different network addresses to different devices or applications based on the type of connection requested. This may result in more efficient communications between end points in a network, as well as increase user convenience and overall network performance.

BRIEF DESCRIPTION OF THE DRAWINGS

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

The embodiments may be directed to techniques to manage network addresses for a communications network. More particularly, the embodiments may assign different network addresses to different devices or applications based on the type of connection requested. This may result in more efficient communications between end points in a network, as well as increase user convenience and overall network performance.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
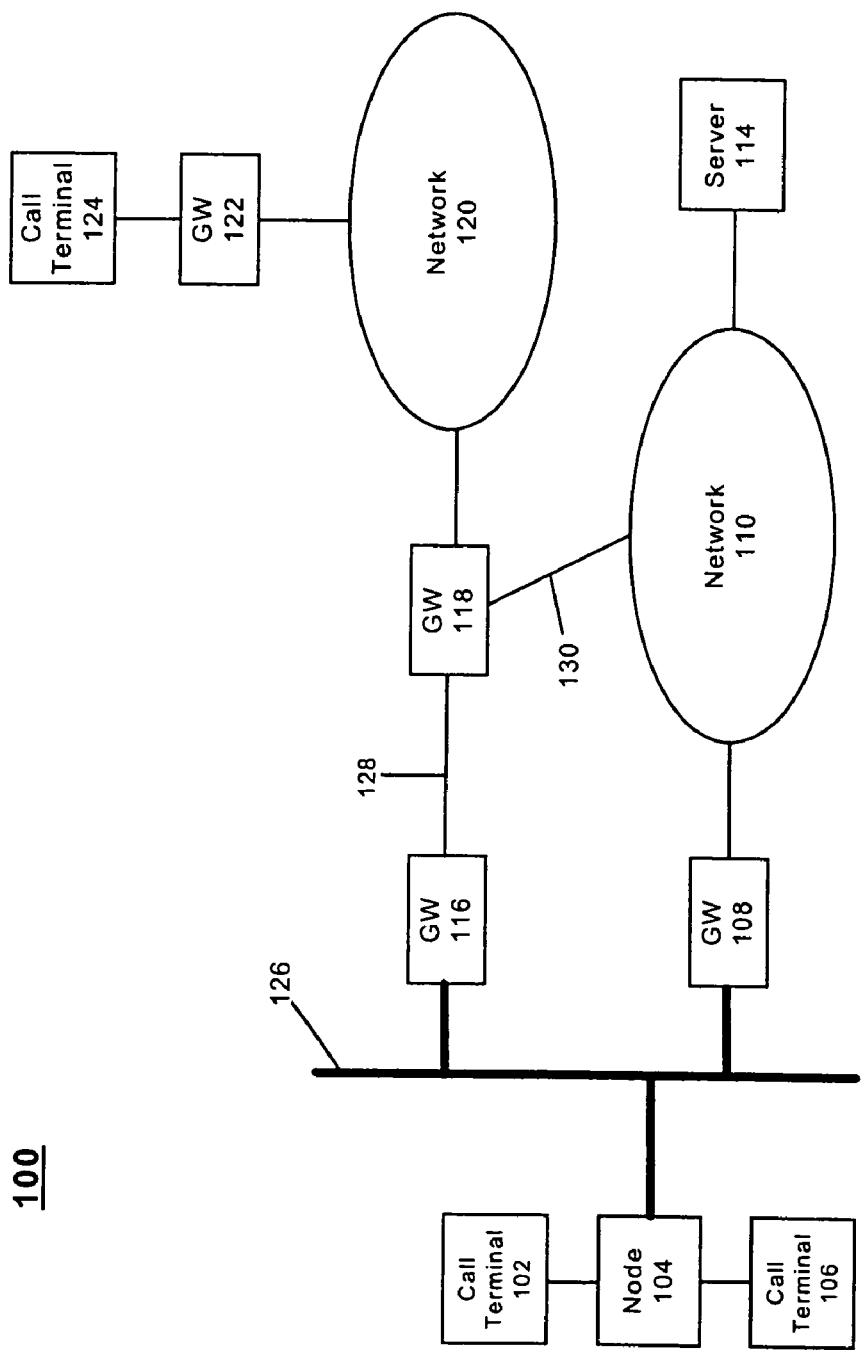
FIG. 1 illustrates a system suitable for practicing one embodiment.

Referring now in detail to the drawings wherein like parts are designated by like reference numerals throughout, there is illustrated in FIG. 1 a system suitable for practicing one embodiment. FIG. 1 is a block diagram of a system 100. System 100 comprises a plurality of network nodes. The term "network node" as used herein may refer to any node capable of communicating information in accordance with one or more protocols. Examples of network nodes may include a computer, server, switch, router, bridge, gateway, personal digital assistant, mobile device, call terminal and so forth. The term "protocol" as used herein may refer to a set of instructions to control how the information is communicated over the communications medium.

In one embodiment, one or more communications mediums connect the nodes. The term "communications medium" as used herein may refer to any medium capable of carrying information signals. Examples of communications mediums may include metal leads, semiconductor material, twisted-pair wire, co-axial cable, fiber optic, radio frequencies (RF) and so forth. The terms "connection" or "interconnection," and variations thereof, in this context may refer to physical connections and/or logical connections.

In one embodiment, the network nodes communicate information to each other in the form of packets. A packet in this context may refer to a set of information of a limited length, with the length typically represented in terms of bits or bytes. An example of a packet length might be 1000 bytes.

In one embodiment, the packets are communicated in accordance with one or more packet protocols. For example, in one embodiment the packet protocols may include one or more Internet protocols, such as the Transmission Control Protocol (TCP) and Internet Protocol (IP). The embodiments are not limited in this context.

In one embodiment, system 100 operates in accordance with one or more protocols to communicate packets representing media and control information. For example, system 100 may operate in accordance with any number of VOP protocols, such as the H.323 protocol, Session Initiation Protocol (SIP), Session Description Protocol (SDP), Megaco protocol, and so forth. The embodiments are not limited in this context.

Referring again to FIG. 1, system 100 comprises a plurality of network nodes. In one embodiment, for example, system 100 comprises call terminals 102 and 106 connected to a network node 104. Network node 104 is connected to a gateway (GW) 108 and a GW 116 via connection 126. Connection 126 may represent, for example, a Local Area Network (LAN). GW 108 is connected to a network 110. A server 114 is also be connected to network 110. GW 116 is connected to a GW 118 via connection 128. Connection 128 may be a dedicated or private line between GW 116 and GW 118, for example. GW 118 is connected to a network 120. GW 122 is also connected to network 120. GW 122 is connected to a call terminal 124. Although FIG. 1 shows a limited number of network nodes, it can be appreciated that any number of network nodes may be used in system 100 and still fall within the scope of the embodiments.

In one embodiment, system 100 comprises a plurality of call terminals, such as call terminals 102, 106 and 124. The term "call terminal" as used herein may refer to any device or application configured to establish multimedia communications for a multimedia session over a multimedia connection. The term "multimedia communications" as used herein may refer to any communication of multimedia information. Multimedia information may refer to any data representing content meant for a user that is time sensitive. Examples of time sensitive content may include data from a voice conversation, voice mail, videoconference, video, streaming video, audio information such as music, graphics, images and so forth. Data from a voice conversation may be, for example, speech information, silence periods, background noise, comfort noise, tones and so forth. The term "multimedia connection" as used herein may refer to any connection over a network having sufficient bandwidth to communicate the multimedia information in accordance with a given quality of service. Quality of service may refer to providing a guarantee of bandwidth in a network for use by a device or application. Bandwidth may refer to the amount of information that may be communicated in a given time period, typically measured in bits or bytes per second. For example, a standard analog telephone communicates voice information at the rate of 64 Kilobits Per Second (Kbps), the Time Division Multiplexing (TDM) sampling rate.

In one embodiment, for example, one or more call terminals may comprise VOP telephones. For example, call terminals 102 and 124 may comprise SIP telephones configured to operate in a SIP network. A SIP network may comprise SIP telephones and SIP servers. The SIP telephones may each comprise a SIP User Agent (SUA) configured to communicate with SIP servers, such as SIP proxy and SIP redirect servers, and SIP gateways. The SUA may operate as a client end point to originate voice communications, while the SIP servers respond to or forwards the voice communications to another client end point, which typically comprises another SUA.

In one embodiment, one or more call terminals may comprise analog telephones. For example, call terminal 106 may comprise an analog telephone and a multimedia terminal adapter (MTA). The MTA may comprise a hardware device that interfaces standard analog telephones to a VOP network. For example, the MTA may provide one or more analog Plain Old Telephone Set (POTS) ports for connection to existing analog phones or facsimile machines. The MTA may also provide one or more Public Switched Telephone Network (PSTN) ports. In addition, the MTA may also include a Fast Ethernet switch and a plurality of physical Ethernet interfaces to support connection to a broadband Digital Subscriber Loop (DSL) modem, cable modem, computer, or home LAN. The MTA may have the appropriate hardware and software to convert the analog voice signals into packets, and communicate the packets over a packet network.

In one embodiment, call terminals 102 and 124 may be configured with video and/or audio equipment. The video equipment may be used to establish a multimedia session such as a video conference call or Video On Demand (VOD) session, for example. Examples of video equipment may include a video camera, video recorder, video player, monitor, and so forth. The audio equipment may be used to establish a multimedia session for communicating high quality voice communications or high fidelity music, such as from Compact Disc (CD) or Digital Video Disc (DVD), for example. Examples of audio equipment may include an audio recorder, an audio player, speakers, and so forth.

In one embodiment, system 100 may comprise a plurality of data devices. For example, network node 104 and server 114 may comprise data devices. A data device may refer to any processing system configured to establish data communications for a data communication session over a data connection. The term "data communications" as used herein may refer to communication of any data that is not time sensitive. Examples of non-time sensitive data may include electronic mail ("email") message, unified messaging information, alphanumeric symbols, text, Hyper Text Markup Language (HTML) documents, Extensible Markup Language (XML) documents, web content, facsimile information, and so forth. The term "data connection" as used herein may refer to any connection over a network to communicate non-time sensitive data. Examples of data devices may include computers, personal computers (PC), servers, laptops, personal digital assistant (PDA), handheld computer, and so forth.

In one embodiment, system 100 may comprise a plurality of gateways. The term "gateway" as used herein may refer to any device or application providing access to a network. Examples of a gateway may include a hub, router, network address translation (NAT) device, server, cable modem, DSL modem, media gateway, and so forth.

In one embodiment, for example, GW 108 and GW 122 may each comprise a DSL or cable modem. Further, GW 108 and GW 122 may implement a number of different functions for LAN 126. For example, GW 108 and GW 122 may operate as a hub, router or switch for a home LAN. GW 108 may connect node 104 to network 110. In one embodiment, network 110 may comprise a public packet network, such as the Internet. Network 110 may connect to a server 114, such as a web server having web content, such as HTML documents, XML documents, and so forth.

In one embodiment, GW 108 may also operate as a Dynamic Host Configuration Protocol (DHCP) server for LAN 126. A DHCP server may use DHCP to dynamically assign network addresses to a device on a network, such as LAN 126. The network address may comprise, for example, an IP address in accordance with the IP Version Four (IPv4) or IP Version Six (IPv6) specifications. With dynamic addressing, a device can have a different IP address every time it connects to the network. In some cases, the IP address may even change during a multimedia or data session. The DHCP server may also support a mix of static and dynamic IP addresses.

GW 108 may dynamically assign IP addresses to devices on LAN 126 using a DHCP table. Each device on the network may have one or more Media Access Controller (MAC) addresses. The DHCP table may associate an IP address with each MAC address. Whenever a device requests a connection outside of LAN 126, it may request an IP address from the DHCP server. The request may include the MAC address of the requesting device. The DHCP server may receive the request, retrieve the MAC address, and look up an IP address associated with the MAC address in the DHCP table. In this manner, a network device may be dynamically assigned an IP address.

Although GW 108 may be configured to perform as a DHCP server, it may be appreciated that other network nodes may be configured to perform this function and still fall within the scope of the embodiments. For example, a network node that is part of network 120, such as GW 118, may also be configured to operate as a DHCP server. In this case GW 108 may be configured to forward the request for IP addresses from node 104 to GW 118. The embodiments are not limited in this context.

In one embodiment, for example, GW 116 may comprise a router or hub connected to LAN 126. GW 116 may be connected to a GW 118 over connection 128. Connection 128 may be any connection capable of providing a given quality of service for a multimedia connection. In one example, connection 128 may be a dedicated connection, such as a T1 or fractal T1. In another example, connection 128 may be a dedicated logical channel over a public network, such as the PSTN. Any type of logical channel may be implemented as long as it may provide the appropriate quality of service needed for a given multimedia connection.

Although system 100 may illustrate two gateways from LAN 126 to networks 110 and 120, it may be appreciated that a single gateway may be used to access both networks. For example, GW 108 may be configured to route traffic between LAN 126 and networks 110 and 120 based on the assigned IP addresses. GW 108 may route traffic to network 120 via network 110 over connection 130, or vice-versa, for example. The embodiments are not limited in this context.

In one embodiment, GW 118 may be a gateway for network 120. Network 120 may comprise a private packet network, such as the AT&T(E Business Network. Unlike a public network, a private network may have the necessary hardware and software to implement a number of advanced network services, such as providing varying levels of quality of service. For example, network 120 may comprise an Asynchronous Transfer Mode (ATM) network configured with Virtual Circuits (VC) and Virtual Paths (VP) that guarantee a certain amount of bandwidth. Consequently, if a pair of end points had the capability of providing high voice quality communications in the 20 Kilohertz (KHz) spectrum, for example, network 120 may be capable of establishing a multimedia connection for such a call.

In general operation, system 100 may be capable of establishing at least two types of connections. For example, system 100 may establish a multimedia connection between call terminals, such as call terminal 102 and call terminal 124. In another example, system 100 may establish a data connection between data devices, such as network node 104 and server 114. In some cases, however, the multimedia connection may require a higher quality of service than needed for a data connection. In such a case, it may be desirable to implement techniques to ensure that a multimedia connection be established over a private network, such as network 120. Data connections, however, may require a lower quality of service. Therefore it may be desirable to implement techniques to ensure that a data connection be established over a public network, such as network 110.

In one embodiment, network node 104 may be configured to assign different IP addresses to different devices based on the type of connection requested by the device. For example, network node 104 may receive a request for a data connection from an application executed on network node 104, such as a web browser. In this case, network node 104 may request an EP address from GW 108 operating as a DHCP server to establish a data connection with server 114 over network 110. In another example, network node 104 may receive a request for a multimedia connection from call terminal 102 or 106. The multimedia connection may require a higher quality of service than offered by network 110, for example. In this case, network node 104 may request a different IP address from GW 108 to establish a multimedia connection with call terminal 124 over network 120. The IP address for the multimedia connection may comprise, for example, a private and non-routable IP address to ensure that all multimedia traffic from LAN 126 gets routed only through the private network.

The use of a dual IP addressing architecture ensures that a connection for non-critical traffic may be assigned one IP address for routing through a lower quality of service network, while a connection for high-quality/critical traffic may be assigned a different IP address for routing through a higher quality of service network. The higher quality of service network may be better tuned for this type of time sensitive traffic, such as voice information for a VOP telephone call, for example. The use of dual IP addressing may also reduce potential theft of service by ensuring that the higher quality of service network is maintained as a private network. The dual IP addressing architecture may be further described with reference to FIG. 2.

Figure 2:
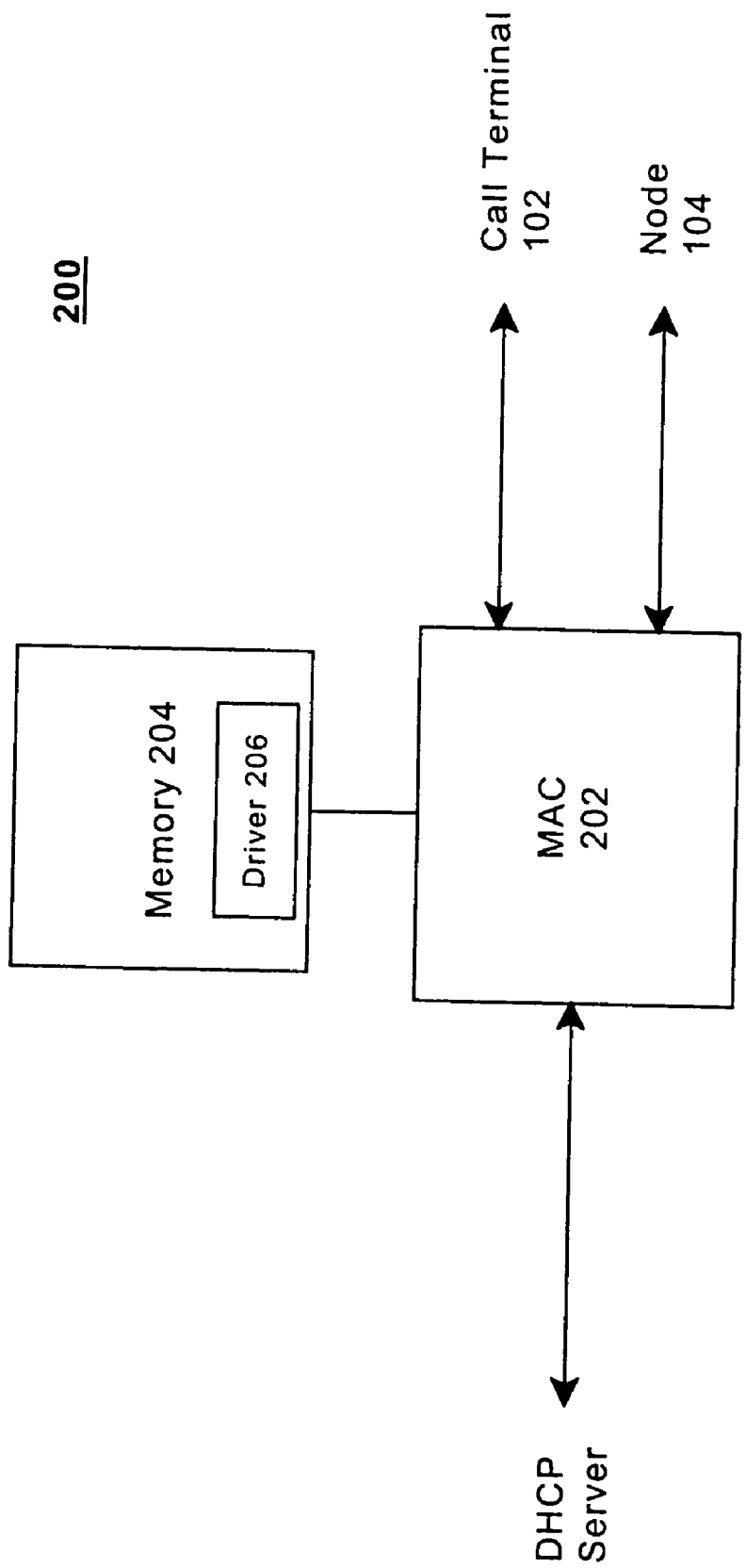
FIG. 2 illustrates a block diagram of a network interface card (NIC) in accordance with one embodiment.

FIG. 2 illustrates a network interface card (NIC) in accordance with one embodiment. FIG. 2 illustrates a portion of a NIC 200. In one embodiment, NIC 200 may be implemented as part of network node 104, for example. NIC 200 may comprise one or more modules. In one embodiment, for example, NIC 200 comprises a MAC 202 and memory 204. Memory 204 further comprises driver 206. Although the embodiment has been described in terms of "modules" to facilitate description, one or more circuits, components, registers, processors, software subroutines, or any combination thereof could be substituted for one, several, or all of the modules.

MAC 202 may implement functionality for the media access control layer for network node 104. The media access control layer comprises one of two sub-layers that make up the Data Link Layer of the Open System Interconnection (OSI) model. The MAC layer is responsible for moving data packets to and from one NIC to another NIC across a shared channel. The MAC sub-layer uses MAC protocols to ensure that signals sent from different stations across the same channel do not collide. Different MAC protocols are used for different shared networks, such as Ethernet, Token Ring, Token Bus, LAN and Wide Area Network (WAN), for example. In one embodiment, for example, MAC 202 may communicate packets over LAN 126 in accordance with the Ethernet specification.

In a typical configuration, a MAC may have a single MAC address. The MAC address is a hardware address that uniquely identifies each network node. The MAC address may be used to communicate packets between two devices on the same network, such as network node 104 and GW 108. Each packet typically includes the MAC address as the source address if sending the packets, and the destination address when receiving packets.

In one embodiment, MAC 202 may be assigned more than one MAC address. For example, MAC 202 may be assigned two MAC addresses. This may be accomplished using driver 206. Driver 206 may use one MAC address when requesting a first IP address, and a second MAC address when requesting a second IP address. Each IP address may be used to establish a connection through a different network. Each network may offer varying levels of quality of service, thereby ensuring that each requested connection is given the appropriate quality of service.

In one embodiment, driver 206 may comprise computer program instructions and data. The term "program instructions" may include computer code segments comprising words, values and symbols from a predefined computer language that, when placed in combination according to a predefined manner or syntax, cause a processor to perform a certain function. Examples of a computer language may include C, C++, JAVA, assembly and so forth. MAC 202 may operate in accordance with driver 206.

In one embodiment, driver 206 may be stored in memory 204. Memory 204 may comprise a machine-readable medium and may include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk ( floppy disk and hard drive), optical disk (es, CD-ROM) and any other media that may store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, NIC 200 may contain various combinations of machine-readable storage devices through various I/O controllers, which are accessible by MAC 202 and which are capable of storing a combination of computer program instructions and data.

In general operation, NIC 200 may be configured to operate with any suitable technique for controlling communication signals between network devices using a desired set of communications protocols, services and operating procedures, for example. In one embodiment, NIC 200 may operate, for example, in accordance with the Ethernet and/or TCP/IP specifications, although the embodiments are not limited in this context. NIC 200 may also include appropriate connectors for connecting NIC 200 with a suitable communications medium. NIC 200 may receive communication signals over any suitable medium such as metal leads, semiconductor material, twisted-pair wire, co-axial cable, fiber optic, radio frequencies (RF) and so forth. In one embodiment, NIC 200 may be configured to implement a dual IP addressing scheme as described above.

The operations of system 100 and NIC 200 may be further described with reference to FIG. 3 and accompanying examples. Although FIG. 3 as presented herein may include a particular programming logic, it can be appreciated that the programming logic merely provides an example of how the general functionality described herein can be implemented. Further, the given programming logic does not necessarily have to be executed in the order presented unless otherwise indicated. In addition, although the given programming logic may be described herein as being implemented in the above-referenced modules, it can be appreciated that the programming logic may be implemented anywhere within the system and still fall within the scope of the embodiments.

Figure 3:
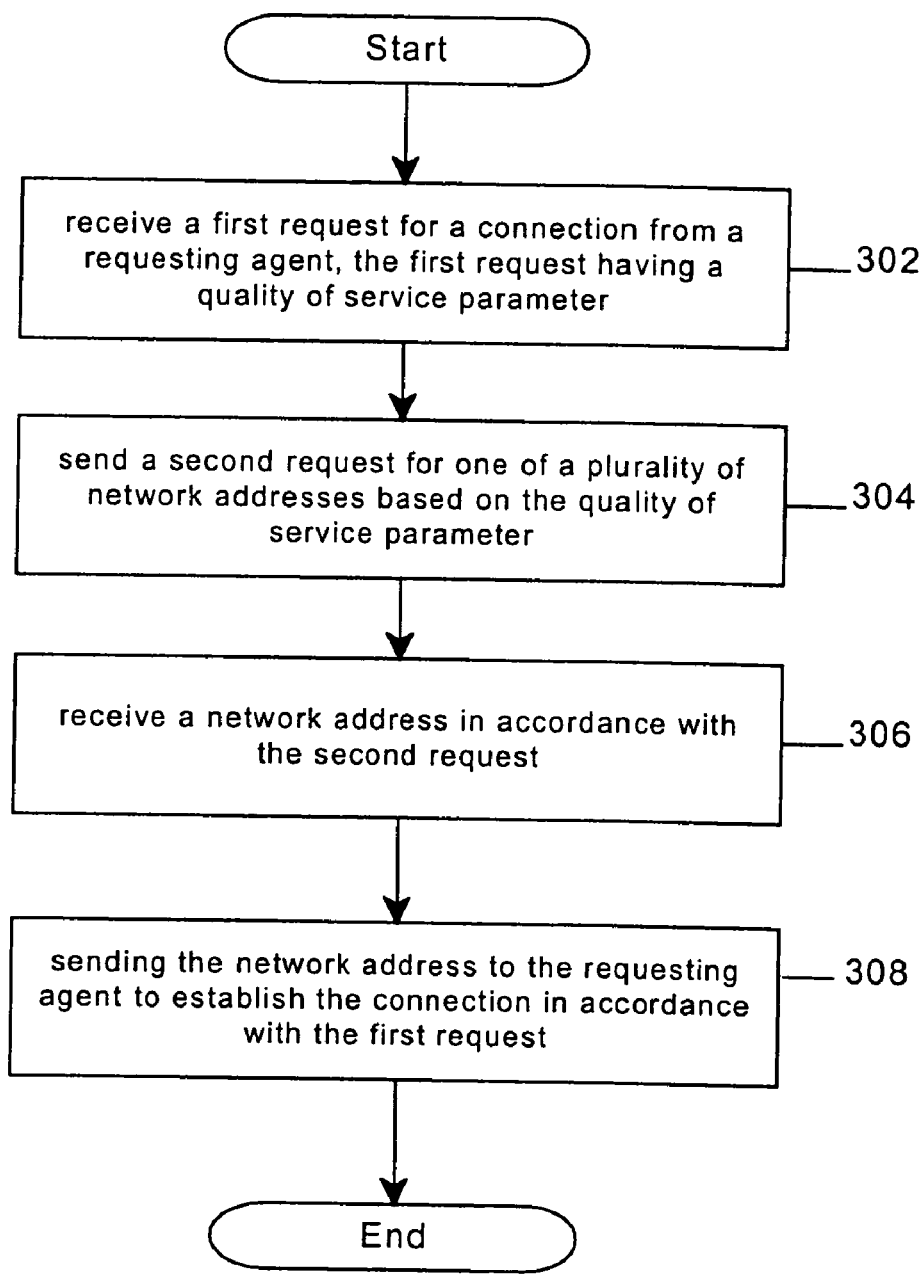
FIG. 3 is a block flow diagram of the programming logic performed by a Dual Internet Protocol Address (DIPA) driver module in accordance with one embodiment.

FIG. 3 illustrates a programming logic for a Dual IP Address (DIPA) driver module in accordance with one embodiment. FIG. 3 illustrates a programming logic 300 for a DIPA driver module. The DIPA driver module may provide different network addresses for different network devices based on the type of connection requested by the network device. The connection types may vary according to different levels of quality of service required for the connection.

As shown in programming logic 300, a first request for a connection may be received from a requesting agent at block 302. The first request may include a quality of service parameter. A second request may be sent for one of a plurality of network addresses based on the quality of service parameter at block 304. A network address may be received in accordance with the second request at block 306. The network address may be sent to the requesting agent to establish the connection in accordance with the first request.

In one embodiment, a requesting agent may be any application or network device requesting a connection. For example, the requesting agent may comprise part of a multimedia module, such as call terminals 102, 106 and 124. A multimedia module may comprise any application or device capable of generating multimedia information. An example of a multimedia module may include a MTA and analog telephone. Other examples of a multimedia module may also include a VOP telephone, video equipment, audio equipment, and any other multimedia devices. In another example, the requesting agent may comprise part of a data module, such as network node 104 and server 114. A data module may comprise any application or device capable of generating data. Examples of a data module may comprise a computer, server, workstation or application program. Examples of application programs may include email applications, unified messaging applications, web browsing applications, and so forth.

In one embodiment, each network address from the plurality of network addresses may comprise a network address for a different network. For example, a first network address from the plurality of network addresses may comprise a network address for a private network, and a second network address from the plurality of network addresses may comprise a network address for a public network. It may be appreciated that other IP addresses may also be used to represent other networks as well for a given implementation. The embodiments are not limited in this context.

In one embodiment, the second request may be sent by retrieving the quality of service parameter from the first request. The quality of service parameter may indicate whether the requested connection is for a multimedia connection or a data connection. If the requested connection is a multimedia connection, then the network address may comprise the first network address. Examples of a multimedia connection may comprise a voice connection, video connection, audio connection, and so forth. If the requested connection is a data connection, then the network address may comprise the second network address. Examples of a data connection may comprise a connection to the Internet, email, unified messaging, and so forth.

Once the quality of service parameter is retrieved, the quality of service parameter may be used to formulate the proper request to the DHCP server for the first or second network address. If the quality of service parameter indicates a multimedia connection, then the second request may be for the first network address. If the quality of service parameter indicates a data connection, then the second request may be for the second network address.

Whether the second request is for the first or second network address may be implemented using a first or second MAC address, respectively. The second request is constructed with the first or second MAC address, and sent to the DHCP server. The DHCP server may retrieve the appropriate network address corresponding to the MAC address, and send the network address to the network node.

It may be appreciated that the designators such as "first request" and "second request" do not necessarily refer to the actual first and second requests, respectively. Rather, these designators are used to differentiate different types of request for purposes of clarity of illustration, and are not intended to limit the scope of the embodiments.

The operation of system 100 and NIC 200, as well as the programming logic shown in FIG. 3, may be better understood by way of example. Assume an application for network node 104 sends a request to establish a data connection with server 114. The application may comprise, for example, a web browser. Server 114 may be a web server having web content in the form of HTML documents. The application may send a first request for a network address to NIC 200. Driver module 206 of NIC 200 may receive the first request and determine whether the first request is for one of a multimedia connection or data connection. This determination may be made by retrieving a quality of service parameter from the first request. Alternatively, this determination may also be made using a source identifier for the application, for example. Driver module 206 may instruct MAC 202 to send a second request for a first network address using a first MAC address for MAC 202 if the first request is for a multimedia connection. Driver module 206 may instruct MAC 202 to send a second request for a second network address using a second MAC address for MAC 202 if the first request is for a data connection. In this example, the first request is for a data connection, so MAC 202 may send the second request for the second network address using the second MAC address for MAC 202.

NIC 200 may send the second request to GW 108 via LAN 126. GW 108 operating as a DHCP server receives the first request, and retrieves the second MAC address from the second request. GW 108 may search a DHCP table for the IP address corresponding to the second MAC address. An example of a DHCP table may be shown in Table 1 as follows:

| MAC Address | IP Address |
|---|---|
| 00:00:00:01 | 10.0.0.1 |
| 00:00:00:02 | 192.168.1.2 |

For example, assume the second MAC address comprises 00:00:00:02, GW 108 may retrieve this MAC address, and find the corresponding IP address. In this case, the corresponding IP address is a global IP address of 192.168.1.2, GW 108 may then send the IP address 192.168.1.2 to network node 104. Driver module 206 may retrieve the IP address 192.168.1.2 and send it to the requesting agent, which in this example is an application program. Application program may use the IP address 192.168.1.2 to establish a data connection to server 114 via GW 108 and public network 110.

In another example, assume call terminal 102 sends a request to network node 104 to establish a multimedia connection for a VOP telephone call with call terminal 124. Call terminals 102 and 124 may comprise, for example, SIP telephones (i.e., SUA). Call terminal 102 may send a first request for a network address to NIC 200. Driver module 206 of NIC 200 may receive the first request and determine that the first request is for a multimedia connection. Driver module 206 may instruct MAC 202 to send a second request for a first network address using a first MAC address for MAC 202 since the first request is for a multimedia connection. Referring again to Table 1, MAC 202 may send the second request using the first MAC address, which in this example is 00:00:00:01. GW 108 may retrieve this MAC address, and find the corresponding IP address. In this case, the corresponding IP address is a private and non-routable IP address of 10.0.0.1. GW 108 may then return the IP address 10.0.0.1 to network node 104. Driver module 206 may retrieve the IP address 10.0.0.1 and send it to the requesting agent, which in this example is call terminal 102. Call terminal 102 may use the IP address to establish a multimedia connection to call terminal 124 via GW 116, GW 118, private network 120 and GW 122, in accordance with the SIP specification.

In an alternative embodiment, it may be possible to provision MAC 202 with a single MAC address. In this case, the first IP address may need to be static and hard coded with driver module 206. Whenever driver module 206 receives a first request for a multimedia connection, it may return the first IP address without corresponding with the DHCP server. Whenever driver module 206 receives a first request for a data connection, it may correspond with the DHCP server to retrieve the IP address using the single MAC address.

The embodiments may be implemented using an architecture that may vary in accordance with any number of factors, such as desired computational rate, power levels, heat tolerances, processing cycle budget, input data rates, output data rates, memory resources, data bus speeds and other performance constraints. For example, one embodiment may be implemented using software executed by a processor. The processor may be a general-purpose or dedicated processor, such as a processor made by Intel® Corporation, for example. The software may comprise computer program code segments, programming logic, instructions or data. The software may be stored on a medium accessible by a machine, computer or other processing system. In another example, one embodiment may be implemented as dedicated hardware, such as an Application Specific Integrated Circuit (ASIC), Programmable Logic Device (PLD) or Digital Signal Processor (DSP) and accompanying hardware structures. In yet another example, one embodiment may be implemented by any combination of programmed general-purpose computer components and custom hardware components. The embodiments are not limited in this context.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method, comprising:
    receiving, at a media access controller (MAC), a first request for a connection from a requesting agent, the first request having a quality of service parameter indicating one of a multimedia connection and a data connection;
    sending to a dynamic host configuration protocol (DHCP) server a second request for one of a plurality of network addresses using one of first and second MAC addresses associated with the MAC based on the quality of service parameter, wherein the sending the second request comprises:
    retrieving the quality of service parameter from the first request,
    sending the second request for a first network address using the first MAC address if the quality of service parameter indicates the multimedia connection, and
    sending the second request for a second network address using the second MAC address if the quality of service parameter indicates the data connection;
    receiving a network address in accordance with the second request; and
    sending the received network address to the requesting agent to establish the connection in accordance with the first request.

2. The method of claim 1, wherein each network address from the plurality of network addresses comprises a network address for a different network.

3. The method of claim 1, wherein a first network address from the plurality of network addresses comprises a network address for a private network, and a second network address from the plurality of network addresses comprises a network address for a public network.

4. The method of claim 3, wherein the connection comprises a multimedia connection.

5. The method of claim 4, wherein the multimedia connection comprises one of a voice connection, video connection and audio connection.

6. The method of claim 3, wherein the connection comprises a data connection.

7. The method of claim 1, wherein the second request is a dynamic host configuration protocol (DHCP) request.

8. The method of claim 7, wherein the sending the second request comprises:

sending the dynamic host configuration protocol request to the DHCP server; and receiving the network address from the DHCP server.

9. An apparatus, comprising:

a media access controller (MAC) having a plurality of MAC addresses;

a requesting agent to connect to the MAC, the requesting agent to send a first request for a network address; and a driver module to connect to the MAC and the requesting agent, the driver module to receive the first request and determine whether the first request is for one of a multimedia connection or data connection, the driver module to instruct the MAC to send a second request to a dynamic host configuration protocol (DHCP) server, the DHCP to connect to the MAC, for a first network address using a first MAC address if the first request is for a multimedia connection, and to send a second request for a second network address using a second MAC address if the first request is for a data connection.

10. The apparatus of claim 9, wherein the driver module sends the first or second network address to the requesting agent to establish the connection in accordance with the first request.

11. The apparatus of claim 9, wherein the requesting agent comprises part of a multimedia module.

12. The apparatus of claim 11, wherein the multimedia module comprises a multimedia terminal adapter and analog telephone.

13. The apparatus of claim 11, wherein the multimedia module comprises at least one of a packet telephone, video equipment and audio equipment.

14. The apparatus of claim 9, wherein the requesting agent comprises part of a data module.

15. The apparatus of claim 14, wherein the data module comprises one of a computer, server and workstation.

16. The apparatus of claim 9, wherein the DHCP server retrieves one of the first network address and the second network address from a DHCP table, and sends the retrieved network address to the MAC.

17. A non-transitory computer readable medium storing computer executable instructions, the computer executable instructions defining steps comprising:

receiving, at a media access controller (MAC), a first request for a connection from a requesting agent, the first request having a quality of service parameter indicating one of a multimedia connection and a data connection;

sending from the MAC to a dynamic host configuration protocol (DHCP) server a second request for one of a plurality of network addresses using one of first and second MAC addresses associated with the MAC based on the quality of service parameter, wherein the sending the second request comprises:

retrieving the quality of service parameter from the first request, sending the second request for a first network address using the first MAC address if the quality of service parameter indicates the multimedia connection, and sending the second request for a second network address using the second MAC address if the quality of service parameter indicates the data connection;

receiving a network address in accordance with the second request; and sending the received network address to the requesting agent to establish the connection in accordance with the first request.

18. The computer readable medium of claim 17, wherein the computer executable instructions defining the step of sending a second request comprise computer executable instructions defining the steps of:

sending a dynamic host configuration protocol (DHCP) to the DHCP server; and receiving the network address from the DHCP server.

* * * * *